US012800414B2

(12) United States Patent
Chen et al.

(10) Patent No.: US 12,800,414 B2
(45) Date of Patent: Nov. 17, 2026

(54) APPARATUS AND METHOD TO DETECT RESIDUAL STRESS AROUND COLD EXPANDED HOLES USING LONGITUDINAL CRITICALLY REFRACTED WAVES

(71) Applicant: Southwest Research Institute, San Antonio, TX (US)

(72) Inventors: Xin Chen, San Antonio, TX (US); Adam C. Cobb, San Antonio, TX (US); Douglas R. Earnest, San Antonio, TX (US); Clint J. Thwing, Bulverde, TX (US); Nikolay Akimov, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 286 days.

(21) Appl. No.: 18/581,320

(22) Filed: Feb. 19, 2024

(65) Prior Publication Data

US 2024/0280424 A1 Aug. 22, 2024

Related U.S. Application Data

(60) Provisional application No. 63/446,923, filed on Feb. 20, 2023.

(51) Int. Cl.

*G01L 1/25* (2006.01)
*G01N 29/07* (2006.01)

(Continued)

(52) U.S. Cl.

CPC .............. *G01L 1/255* (2013.01); *G01N 29/07* (2013.01); *G01N 29/223* (2013.01);

(Continued)

(58) Field of Classification Search

CPC ...... G01L 1/255; G01N 29/07; G01N 29/223; G01N 29/227; G01N 29/34;

(Continued)

(56) References Cited

U.S. PATENT DOCUMENTS 3,720,098 A * 3/1973 Dixon .................... G01N 29/07 73/609
5,297,435 A * 3/1994 Papazian ................ G01N 29/07 73/597

(Continued)

FOREIGN PATENT DOCUMENTS

CN 213658137 U * 7/2021

*Primary Examiner* — Jonathan M Dunlap
(74) *Attorney, Agent, or Firm* — Livingston Law Firm

(57) ABSTRACT

A method for detecting residual stress induced by cold expansion (Cx) (Cx stress) at a hole in a structure. Two transducer pairs transmit and receive ultrasonic waves into the structure in a pitch-catch configuration along two first paths parallel to a tangent of the hole. The two paths are at different distances from the hole. Both transducer pairs are arranged such that their incident angle into the structure provides longitudinal critically refracted (LCR) waves within the structure. Time-of-flight (ToF) measurements of the LCR waves along the first path and the second path are the basis of acoustoelasticity calculations that determine if Cx stress is present at the hole.

7 Claims, 7 Drawing Sheets

(51) Int. Cl.
*G01N 29/22* (2006.01)
*G01N 29/34* (2006.01)
*G01N 29/44* (2006.01)

(52) U.S. Cl.
CPC ........... *G01N 29/227* (2013.01); *G01N 29/34* (2013.01); *G01N 29/4436* (2013.01); *G01N 2291/011* (2013.01); *G01N 2291/0234* (2013.01); *G01N 2291/02827* (2013.01); *G01N 2291/0421* (2013.01); *G01N 2291/105* (2013.01)

(58) Field of Classification Search
CPC ............. G01N 29/4436; G01N 29/043; G01N 2291/011; G01N 2291/0234; G01N 2291/02827; G01N 2291/0421; G01N 2291/105
See application file for complete search history.

(56) References Cited

U.S. PATENT DOCUMENTS

| | | | | | |
|---|---|---|---|---|---|
| 11,226,246 | B2 * | 1/2022 | Xu | G01L 5/0047 | |
| 11,635,409 | B2 * | 4/2023 | Luo | G01N 29/07 | 73/597 |
| 12,038,413 | B2 * | 7/2024 | Zhao | G01N 29/4436 | |
| 2021/0025769 | A1 * | 1/2021 | Xu | G01L 1/255 | |
| 2022/0268739 | A1 * | 8/2022 | Luo | G01N 29/07 | |
| 2023/0081998 | A1 * | 3/2023 | Zhao | G01N 29/4436 | 73/579 |
| 2024/0280424 | A1 * | 8/2024 | Chen | G01L 1/255 | |

* cited by examiner

APPARATUS AND METHOD TO DETECT RESIDUAL STRESS AROUND COLD EXPANDED HOLES USING LONGITUDINAL CRITICALLY REFRACTED WAVES

BENEFIT OF PROVISIONAL FILING DATE

This patent application claims the benefit of the filing date of U.S. App. No. 63/446,923, filed Feb. 20, 2023, entitled "Apparatus and Method to Detect Residual Stress Around Cold Expanded Holes Using Longitudinal Critically Refracted Waves".

FEDERALLY SPONSORED RESEARCH AND DEVELOPMENT

This invention was made with United States Government Support under Contract No. FA-8650-19-C-5217 from the United States Air Force/Department of Defense. The Government has certain rights in this invention.

BACKGROUND OF THE INVENTION

Cold expansion (Cx) is a mechanical process to imbue residual compressive stresses near holes in metal structural components. Cold expansion shields the hole from fatigue by creating what is called a "zone of residual compressive stress" around it. These compressive stresses help retard or eliminate fatigue crack growth and thus extend the life of critical components.

For example, in aerospace structures containing holes, cold expansion extends fatigue life of structural components by introducing compressive hoop residual stresses that hinder crack growth at the hole edge. Cold Expansion is used on aircraft to prevent crack growth and provide long term benefits to the structure's fatigue life. As other examples, cold expansion may be used for nut plates, blind fasteners, bushings, liners, and various fittings.

A challenge in fatigue life estimation when a material has Cx-induced stress is that there are few techniques that can detect whether Cx stresses are present. Reliable detection of residual stresses introduced by Cx allows fatigue life analyses to take full advantage of the inspection process to increase inspection intervals. Without some way to confirm the presence of these stresses, it is not safe to include them in fatigue life analyses.

Detection and classification of Cx stress has been an ongoing research area. Many nondestructive evaluation (NDE) techniques, such as X-ray diffraction, eddy current, thermal stress analysis (TSA), and ultrasonics have been considered to detect residual stresses from Cx. These techniques suffer from either lack of sensitivity or challenging application outside of a laboratory environment. Thus, there is a need to develop a field-usable NDE solution with the required sensitivity to detect Cx stresses.

DETAILED DESCRIPTION OF THE INVENTION

Figure 1:
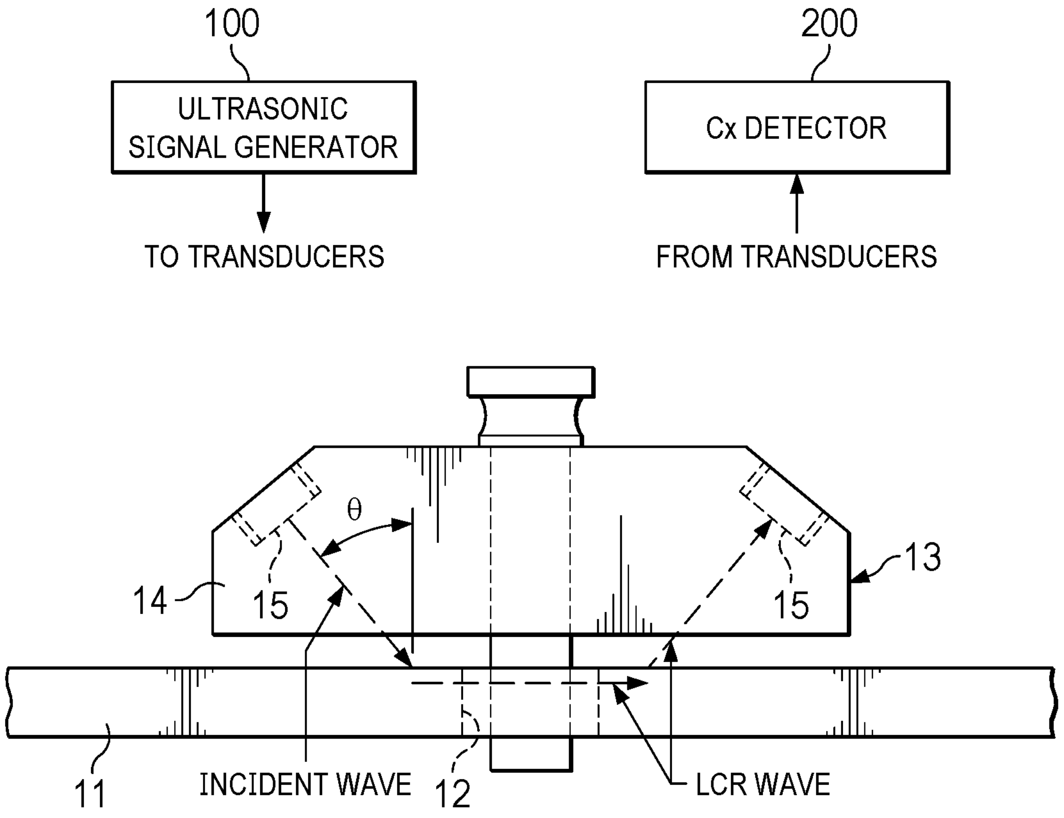
FIG. 1 illustrates the transducer array being used to detect the presence of Cx-induced stress near a hole.

The following description is directed to a method of using ultrasonic waves, specifically longitudinal critically refracted (LCR) waves, to detect the presence of Cx-induced stress near holes. The method does not require calibration using external reference material.

The method detects compressive stress induced by Cx (referred to herein as "Cx stress") near holes. This is important to detect because Cx slows fatigue crack growth, allowing for longer use of a structure compared to when a hole is unstressed. Without a reliable means to detect the Cx stress state, the operator of the structure (such as an aircraft) cannot assume Cx stress is present and must inspect the structure more frequently.

Ultrasonic Stress Measurement

When an ultrasonic longitudinal wave propagates at an angle between two materials having different acoustic velocities, the direction of propagation will be different in the two materials based on a phenomenon known as refraction. The relationship between the angles and wave velocities is given by Snell's Law:

$$\frac{\sin(\theta_I)}{V_I} = \frac{\sin(\theta_T)}{V_T} \quad \text{(Eq. 1)}$$

where $\theta_i$ and $V_i$ are the wave propagation angle and wave velocity in the incident medium, respectively; and $\theta_T$ and $V_T$ are the angle and velocity in the transmitted medium.

When propagating from a slower velocity material to a higher velocity material, it is possible for the wave propagation angle for a longitudinal wave in the transmitted material to approach 90°. At this point, the longitudinal wave is critically refracted and skims below the surface in the transmitted material as an LCR wave. An incident angle to produce LCR waves is determined by the materials.

A commonly used device for LCR wave measurements is an ultrasonic wedge. Wedges used with ultrasonic flaw detection use a specific angle and transducer designed for an intended application. Transducers attach to wedges to hold them in place for accurate readings. As an example, for an acrylic wedge used on aluminum alloys, an incident angle of 26° is needed for generating an LCR wave.

The LCR wave stress measurement method is based on the relationship between wave velocity and stress; i.e., acoustoelasticity. The significance of this wave mode compared to others (e.g., shear or Rayleigh waves) is that the LCR wave velocity is more sensitive to stress than other wave modes. The equation that describes relationship between the change in stress and change in velocity is:

$$\Delta\sigma = k(\Delta V/V) \quad \text{(Eq. 2)}$$

where $\Delta\sigma$ is the stress change from the initial condition, $\Delta V$ is the wave velocity change, V is the longitudinal wave velocity at the initial condition, and k is an acoustoelastic constant.

Cold Expansion Process

As stated in the Background, cold expansion (Cx) produces a ring of compressive residual stress around a through-hole. A typical Cx process pulls an oversized mandrel through a hole, which causes plastic deformation around the hole and a resulting compressive residual stress. Typical cold expansion produces near yield-strength level compressive stress at the edge of the hole, which decays with distance from the hole edge, crossing zero at the distance of 0.5 to 1.0 times the hole diameter from the hole. Compensating tensile residual stresses develop away from the hole to satisfy the requirements of stress equilibrium.

Measurement Method

The goal of the measurement method is to detect the residual stress state around holes to determine whether Cx has been applied correctly and/or if the compressive stress state remains during ongoing inspections. The Cx process produces localized residual hoop stress near the hole that is compressive. Away from the hole, however, the compressive residual stress decreases. The measurement method exploits this stress gradient for Cx detection.

FIG. 1 illustrates a system and method of testing for Cx stress in accordance with the invention. A test structure 11, such as a structure made from plate metal, has at least one hole 12 of interest for detecting Cx stress. In the example of this description, hole 12 has a 0.5 inch diameter.

An ultrasonic wedge transducer array 13 for performing ToF measurements is placed on the surface of structure 11. It is assumed that there is a locally flat surface near hole 12 upon which to place array 13.

Transducer array 13 combines four transducers 15 in a single acrylic acoustic wedge block 14. Because FIG. 1 illustrates array 13 in cross section, only two transducers (one pair) are visible, but array 13 is further illustrated below. Installing all the transducers 15 in a single block ensures that their relative positions are unchanged between measurements and that there is consistent ultrasonic coupling for the transducers 15. Transducers 15 are mounted on or in block 14 to provide the appropriate incident angle.

Block 14 is generally rectangular having a bottom that is typically flat to conform to the surface of the structure. However, two opposing sides of block 14 are angled at the top to provide for attachment of transducers 15 at the appropriate incident angle. Block 14 is an "acoustic block" in the sense that it is a medium appropriate for allowing transducers 15 to transmit ultrasonic waves through the block and into the material being tested. This medium is typically acrylic.

As illustrated, transducers 15 deliver ultrasonic waves to structure 11 at an incident angle that will produce LCR waves within structure 11. In the example of this description, the incident angle is 26 degrees, but this angle may vary depending on the materials of the structure and wedge block. An ultrasonic wave generator 100 is used to generate and deliver ultrasonic waves at a desired frequency to the transducers 15, which then transmit the waves at the desired incidence angle relative to the surface of the structure 11.

A Cx detector 200 receives response signals from transducers 15. As explained below, detector 200 performs time-of-flight (ToF) calculations to determine the presence of Cx stress at hole 12. It is assumed that Cx detector 200 has appropriate hardware and software for performing the tasks and calculations described herein.

For Cx performed with split sleeve techniques, transducer array 13 may be oriented so that measurements are made where the split in the Cx sleeve was located. Split sleeve cold expansion is accomplished by pulling a tapered mandrel, pre-fitted with a disposable split sleeve, through a hole. However, similar results may be achieved with transducer array 13 rotated to other clock positions.

Figure 2:
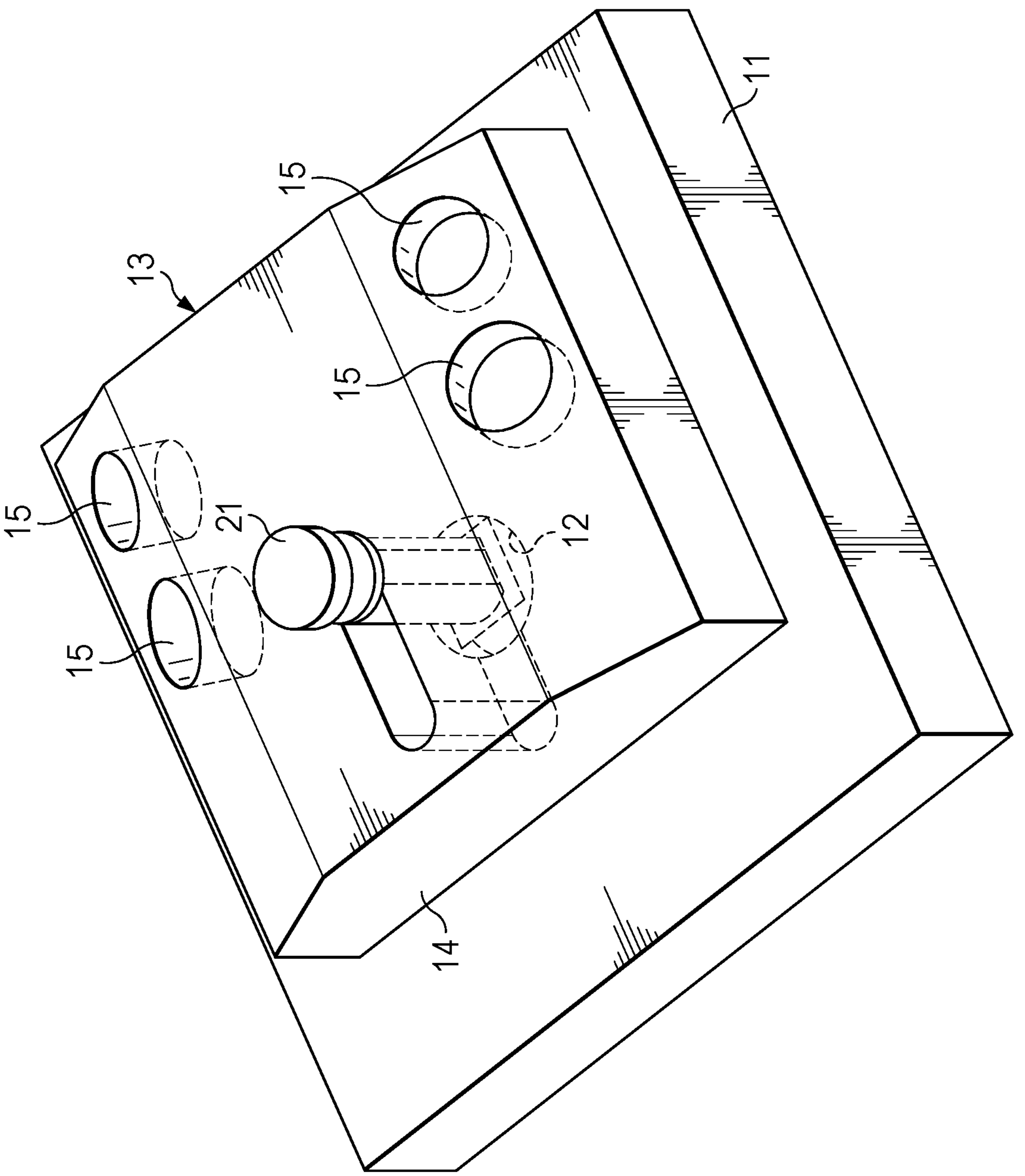
FIG. 2 illustrates one embodiment of the transducer array.
Figure 2A:
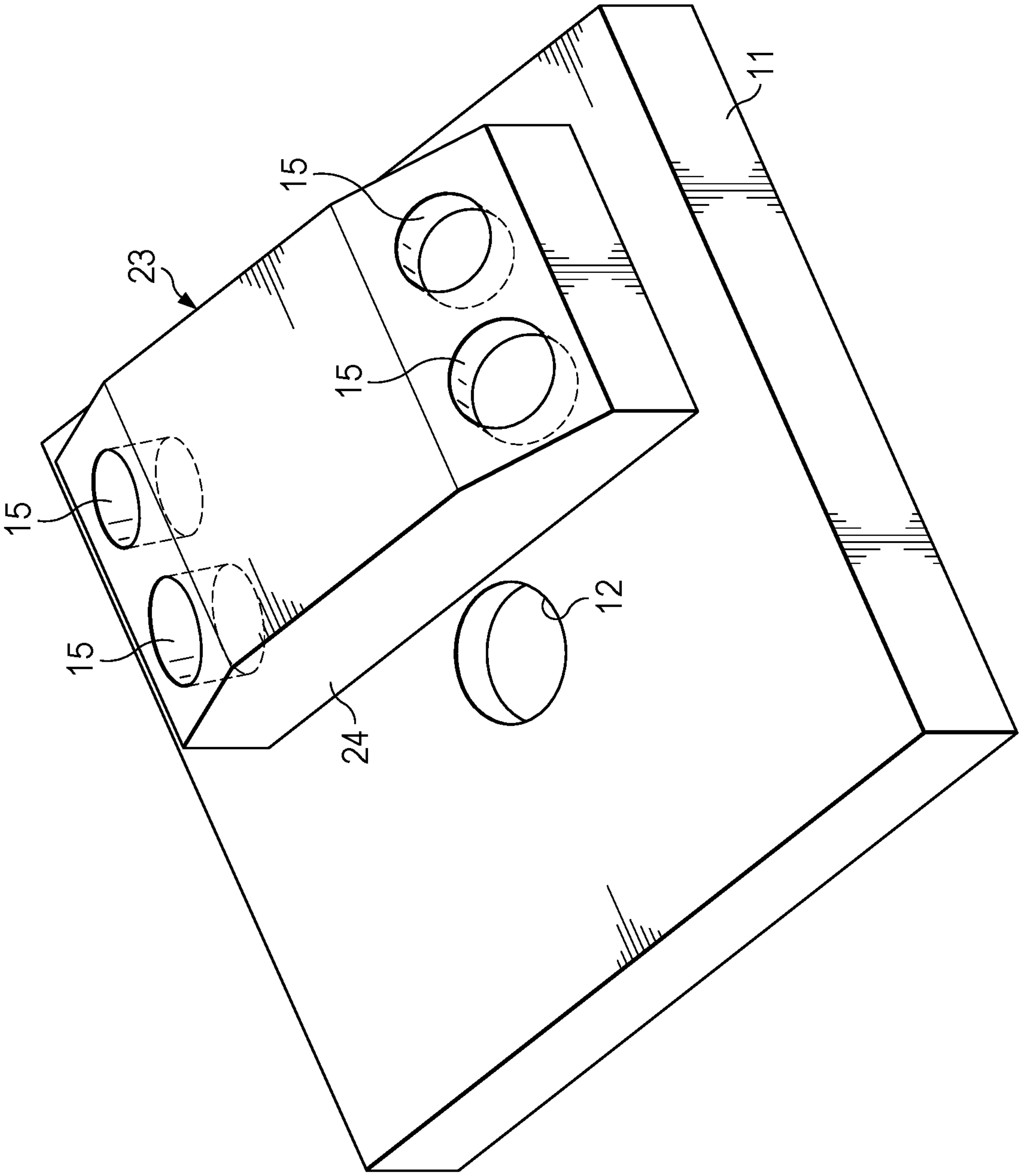
FIG. 2A illustrates an alternative embodiment of the transducer array.
Figure 3:
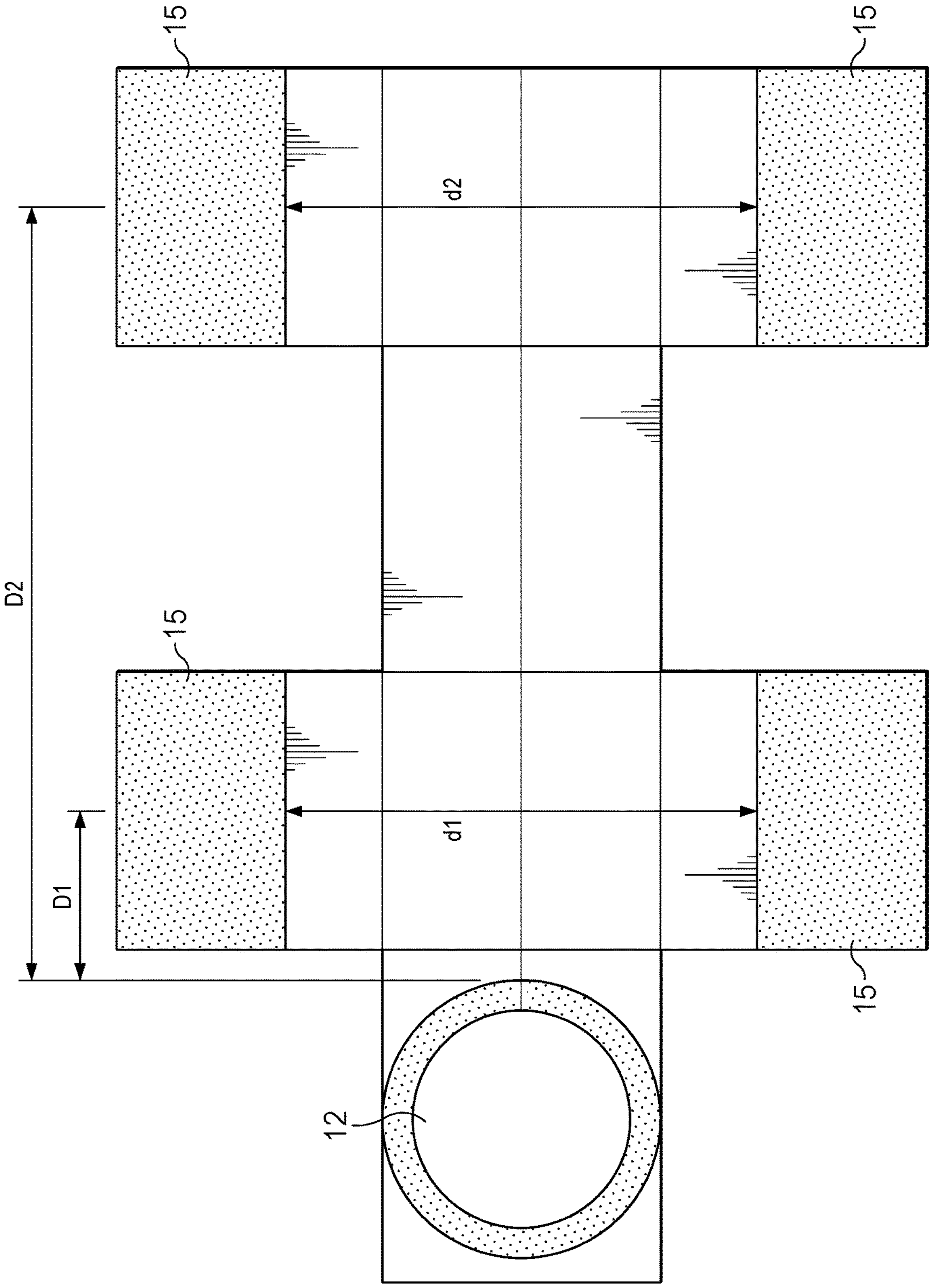
FIG. 3 illustrates the LCR paths between pairs of transducers.

FIGS. 2, 2A, and 3 illustrate transducer array 13 in further detail. FIGS. 2 and 2A are perspective views of alternative embodiments. FIG. 3 is a top view representation of the transducers of both embodiments.

In FIG. 2, transducer array 13 has a simple alignment pin 21 to allow rapid positioning of wedge array in hole 12. In the example of FIGS. 2 and 3, pin 21 is embedded in wedge block 14 and extends from the bottom of block 14 into hole 12. It is placed out of the transmission paths of transducers 15 in a location that will fix the desired distances (D1 and D2) of the transducer paths (d1 and d2) from hole 12 as explained below. The path lengths, d1 and d2, between the transducers of each transducer pair are known and typically equal.

In FIG. 2A, the transducer array 23 has a wedge block 23, but has no pin. Transducer array 23 may be placed next to hole 12 rather than above hole 12. Transducer array 23 is suitable for detecting Cx-stress around a hole 12 with a rivet or other fastener (not shown) in place.

In both embodiments of the transducer array, the four transducers 15 are LCR wave pitch-catch transducers, mounted in block wedge 14 or 24 to control their relative positions. As explained below, transducers 15 are positioned to maximize the LCR response, and data is referenced to base material in structure 11 away from hole 12.

The four transducers 15 all have incident angles of 26 degrees for the case of measurement in aluminum alloys, and they support two pitch-catch LCR wave propagation paths, d1 and d2. Transducers 15 are aligned as two pairs, so that there is a "near" pair and a "far" pair. Both pairs provide data for measuring the LCR wave velocity as it propagates along a straight line that is parallel to the hole tangent. The "near" pair measurement path is close to the hole, for example 0.010 inches away from the hole (D1), and within the region of compressive stress. The "far" pair measurement path is farther from the hole, typically more than 0.60 inches away from the hole (D2) and is outside the compressive region or in a region with the Cx effects are minimal. The "far from the hole" data collection distance may be positioned where tensile stress is maximized to optimize a TOF difference.

All transducers 15 have a sufficiently high frequency, such as a 10 MHz center frequency, to have sufficient resolution to measure time shifts. The transducer diameters are small, e.g., 0.125 inches ("near" pair) or 0.250 inches ("far" pair) to ensure the wave propagation path is narrow in the transverse direction. The near pair of transducers 15 is smaller to allow closer spacing of the near transducers 15 to hole 12 in this example.

The method is based on the difference of the time-of-flight (ToF) of the LCR wave propagating between the two transducer pairs in a path parallel to the hole tangent. TOF measurements at two locations (near the hole and far from the hole) are compared.

TOF is used as an analog for velocity since the propagation path length is held constant using the wedge array 13. The zero-crossing point of the LCR wave was measured to precisely measure a TOF for each transducer pair and measured values were subtracted to find a TOF difference.

Because of slight differences between the transducers 15 and the wedge block 14 or 24, there will always be some difference between the TOF values even with no stress difference. To accommodate this, another TOF difference measurement is made using the measurement apparatus away from the hole, with the propagation direction at the new location parallel to the measurement direction near the hole. Comparing the TOF difference measurements made near the hole with additional measurements made away from any hole in a stress-free location provides a measurement that represents the bulk material TOF value.

A baseline, or reference, TOF difference away from the hole is then subtracted from the TOF difference measured at the hole to produce a normalized TOF difference, the measurement value. Ideally, the difference between the "no Cx" condition and the reference would be zero, but it is not uncommon for there to be some variation close to 5-10 nanoseconds, dependent on the transducer separation arising from local material property or coupling differences. Conversely, a Cx condition should impart a normalized TOF difference more than 15 nanoseconds depending on the transducer separation based on experimental results.

Experimental Results

The efficacy of the method was examined experimentally using transducer array 13. The test holes were 0.5-inch diameter holes with various Cx stress states in test coupons made of two aluminum alloy grades (2024-T351 and 7075-T651). Thirteen test articles made from 2024-T351 and 7075-T651 alloys were produced. Each test article had four 0.5-inch diameter holes that were inspected with No Cx, Low Cx, Mid Cx, or Out Cx conditions. Both 0.250-inch and 0.375-inch specimen thicknesses were included in the data set. Furthermore, two test articles were inspected before and after fatigue cycling of the specimen. Finally, one sample was painted with a 0.005-inch mist coat of epoxy primer MIL-P-23377/MIL-P-85582 with a 0.002-inch polyurethane topcoat MIL-C-85285, which is a relevant service condition for this application. The materials used to produce the test articles were intentionally sourced from multiple vendors.

Cx is typically performed in accordance with a process specification (e.g., FTI Specification 8101). Acceptable ranges on the level of interference between the oversized mandrel and the hole are stated in the specification. For experimentation purposes for the method described herein, additional levels of manufacturing control were used to intentionally apply Cx to the middle (Mid Cx, 4% expansion) and minimum (Low Cx, 3% expansion) of the acceptable process range. In addition, select specimens were intentionally processed with a level of interference outside of the acceptable process limits (Out Cx, 2% expansion). Baseline holes (No Cx) were also included.

Figure 4:
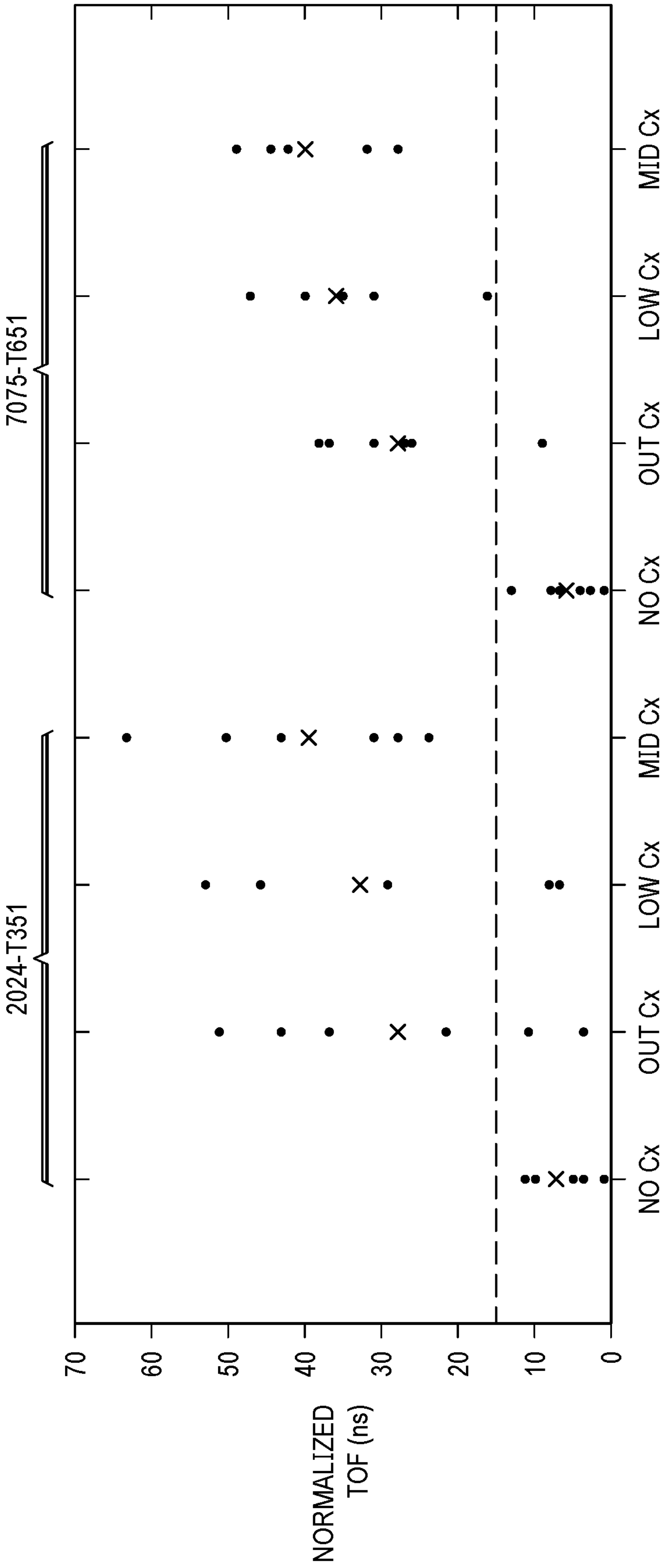
FIG. 4 illustrates normalized time-of-flight values for experimental unfatigued and uncoated test articles.

FIG. 4 illustrates results of the measurement process described above, performed on each of the holes to produce normalized TOF values. Results are shown for the unfatigued and uncoated test articles for both 2024 and 7075 alloys. The plots show the TOF values for each test case with a "dot" marker. The average value for each hole condition (e.g., Low Cx) is denoted by the "X" marker.

The results from the 0.250- and 0.375-inch-thick samples are plotted together but the results from the two alloys are plotted separately. Overall, the average normalized TOF is approximately 7 nanoseconds for the No Cx condition for both alloys. Moreover, the peak normalized TOF measured was 13 nanoseconds from all No Cx holes evaluated. On the other hand, the average TOF values from the different Cx condition/alloy combinations were at least 28 nanoseconds. The measurement variability was greater for the 2024 alloy results. The source of the variability needs further investigation as repeated measurements from a single hole produced a measured standard deviation of approximately 3 nanoseconds whereas the standard deviation from the Cx hole conditions was in the range of 8 to 12 nanoseconds.

To evaluate the effectiveness of this measurement for detecting Cx stress status, a decision threshold of 15 nanoseconds was applied to the data. This threshold allows for correct classification of 43 of the 48 holes evaluated. Moreover, the No Cx and Mid Cx states were correctly classified in 100% of cases. Both fatigue cycling and painting/coating of the samples were also evaluated to determine if they were confounding factors.

Figure 5:
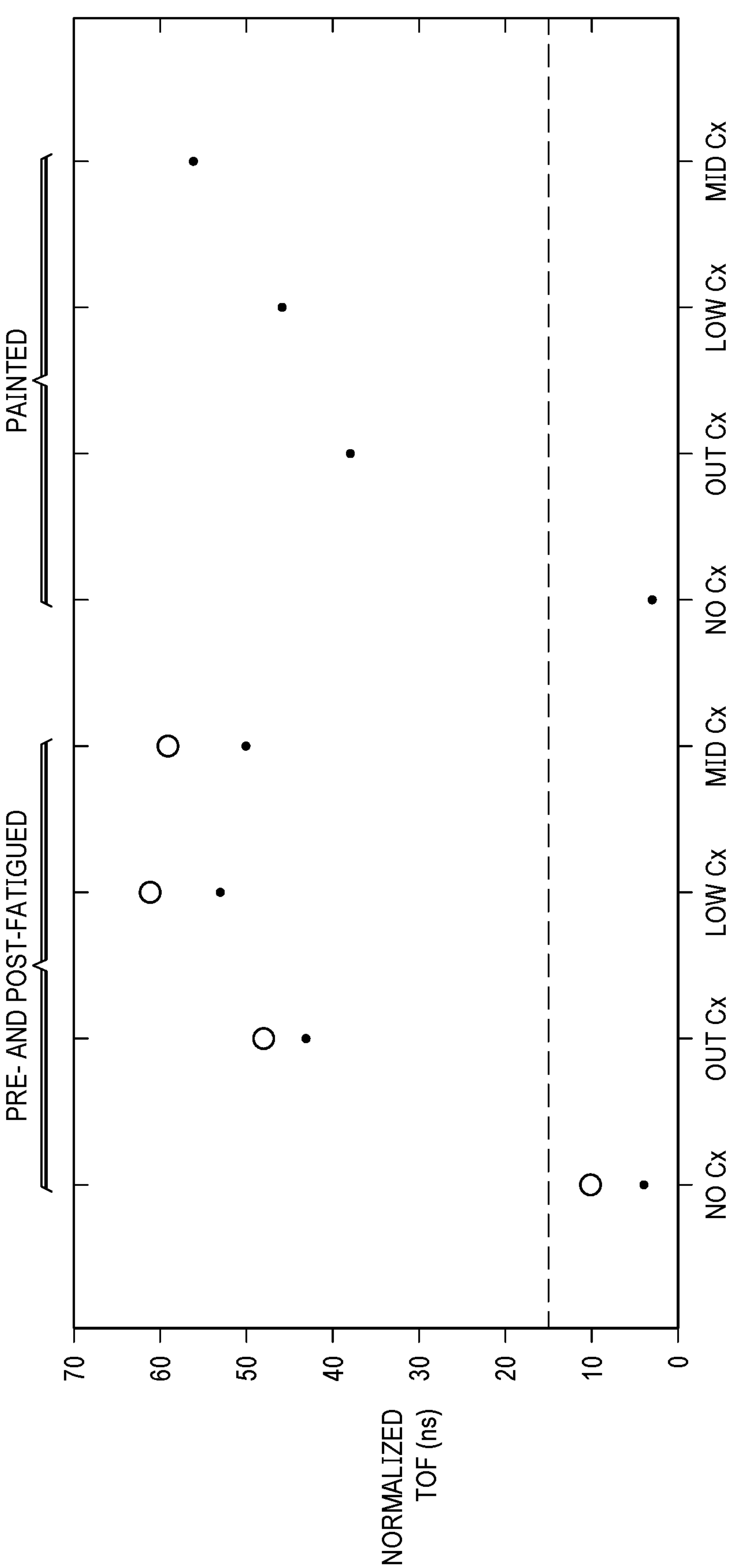
FIG. 5 illustrates normalized time-of-flight values for experimental fatigued test articles.

FIG. 5 illustrates fatiguing results. The left portion shows the pre-fatigue ("dot") and post-fatigue ("circle") TOF measurements from a single sample. The right portion shows the measurement results taken from a painted/coated test specimen.

The fatiguing results on the left of FIG. 5 demonstrate that there is a consistent upward shift in the normalized TOF value after fatiguing of the material in the range of 5 to 9 nanoseconds. The general trends remain the same, however, and the 15-nanosecond decision threshold previously applied was suitable. For the painted/coated sample, the measurement approach was successful at measuring the normalized TOF value and the same general trend was detected.

CONCLUSIONS

An ultrasonic method for detecting the Cx state of a hole was developed based on acoustoelasticity using LCR waves. A feature of the method is that no external material references are required to perform the measurement. Instead, the measurements are referenced to measurements made in the bulk of the material away from the hole being evaluated. The technique was shown to be successful at detecting Cx conditions in both 2024-T351 and 7075-T651 alloys. The best results were achieved when the Cx application process resulted in expansion percentages of approximately 4%, but expansion percentages of 2% and 3% were also typically detected. Neither fatiguing nor painting of the test sample degraded the performance of the measurement technique. Overall, the technique is a promising approach for detecting Cx that should be applicable to field use with further technique development.

Test System Alternatives

Figure 6:
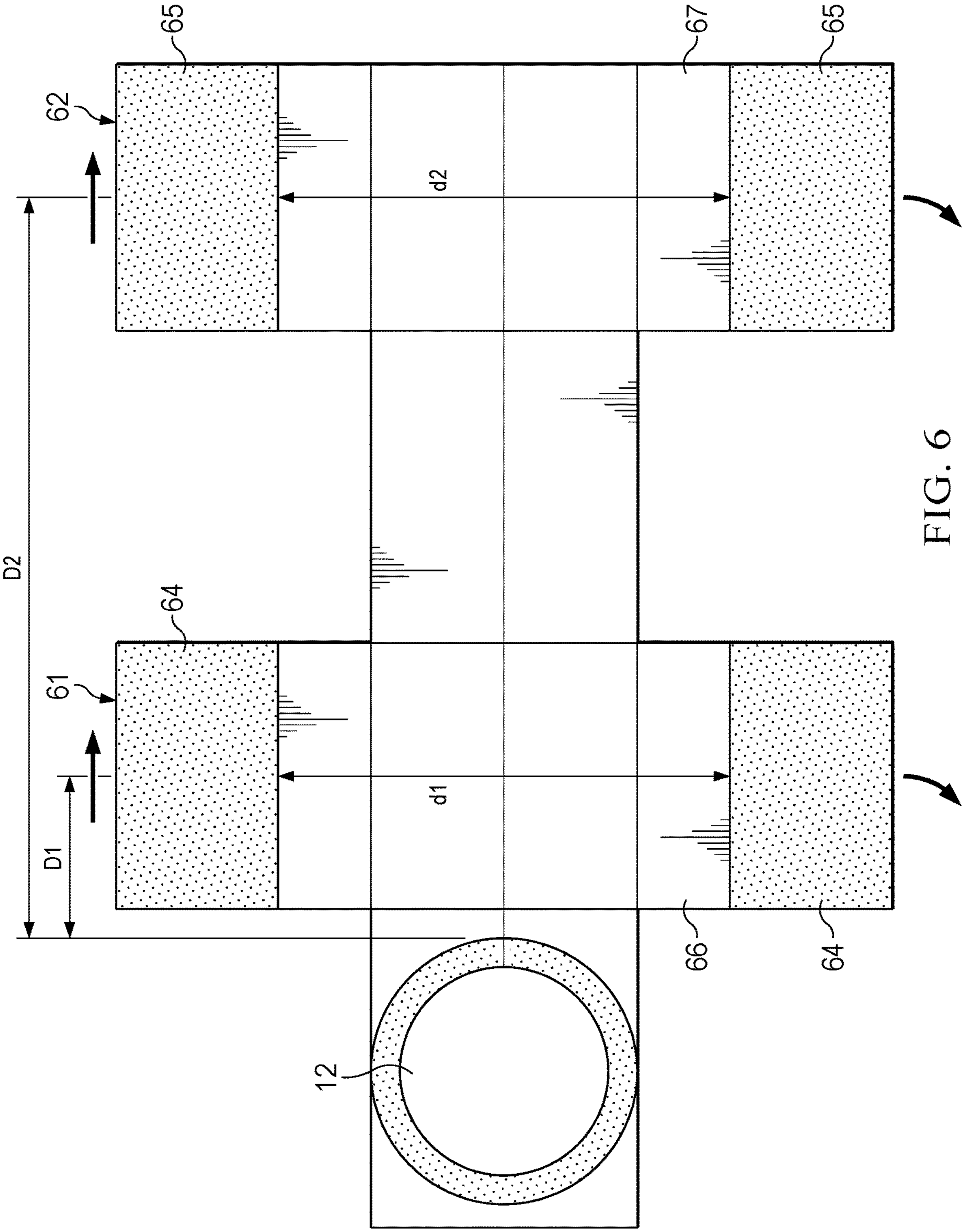
FIG. 6 illustrates Cx detection methods using multiple transducer positions.

FIG. 6 illustrates the above-described method, in plan view, performed with two pairs of transducers, in a manner similar to that described above in connection with FIG. 3. The method is performed with a near transducer pair 61 and a far transducer pair 62, positioned for the appropriate incident angle into the test structure.

However, in FIG. 6, each transducer pair is mounted in or on its own acrylic acoustic wedge block 66 and 67. As described above, blocks 66 and 67 fix the incident angles of their transducer pair. Each block 66 and 67 spaces its transducer pair the same distance apart as the other, providing equal paths lengths, d1 and d2.

During measurements, one or both of the transducer pairs may be moved in a radial direction around hole 12. This provides more than one near and/or far ToF measurement. The radial motion may be achieved manually or with an electromechanical motor.

The distances D1 and D2 may be maintained with various tracks or distance sensors. In addition to different radial positions of transducer pairs or as an alternative to different radial positions, ToF measurements may be made at different circumferential positions.

When one or more of the transducer pairs is moved to provide additional measurements, rotational and/or linear position encoders may be used to measure transducer locations during the inspection.

As an alternative to performing measurements at multiple positions around the hole, a transducer array may have more than two transducer pairs at different radial or circumferential positions relative to the hole.

Thus, test results may be based on a single TOF difference value for the hole, several TOF difference values at different radial distances or circumferential positions near a hole, or a 2-D map of TOF differences at different circumferential and radial distances.

For some applications, it may be beneficial to permanently install two transducer pair(s) to measure the TOF difference while the system is in operation. This allows structural health monitoring over time.

The invention claimed is:

1. A method for detecting residual stress induced by cold expansion (Cx) (Cx stress) at a hole in a structure, comprising:

- using a first transducer pair to transmit and receive ultrasonic waves into the structure in a pitch-catch configuration along a first path parallel to a tangent of the hole;
- wherein the first path is a first distance from the hole where Cx stress will be present if the material has undergone Cx;
- using a second transducer pair to transmit and receive ultrasonic waves into the structure in a pitch-catch configuration along a second path parallel to the tangent of the hole;
- wherein the second path is a second distance from the hole where Cx stress will have little or no presence if the material has undergone Cx;
- wherein the first transducer pair and the second transducer pair are arranged such that their incident angle into the structure provides longitudinal critically refracted waves (LCR) within the structure;
- generating LCR waves within the structure along the first path and the second path;
- measuring the time-of-flight (ToF) of the LCR waves along the first path and the second path;
- comparing the ToF measurements along the first path and the second path, thereby obtaining a ToF difference; and
- using acoustoelasticity calculations to determine if Cx stress is present at the hole.

2. The method of claim 1, wherein the second path is at a distance from the hole where tensile stress is maximized.

3. The method of claim 1, further comprising repeating the generating and measuring steps for a third transducer pair at a distance from the hole where there is no Cx stress, thereby obtaining a reference ToF measurement.

4. The method of claim 1, further comprising moving the first transducer pair and/or the second transducer pair in a radial direction near the hole, and repeating the generating, measuring, comparing, and using steps.

5. The method of claim 1, further comprising moving the first transducer pair and/or the second transducer pair in a circumferential direction near the hole, and repeating the generating, measuring, comparing, and using steps.

6. The method of claim 1, wherein the first pair of transducers and the second pair of transducers are mounted in the same acoustic block.

7. A device for detecting residual stress induced by cold expansion (Cx) (Cx stress) at a hole in a structure, comprising:

- an acoustic block;
- a first transducer pair mounted in or on the acoustic block, operable to transmit and receive ultrasonic waves into the structure in a pitch-catch configuration along a first path parallel to a tangent of the hole;
- wherein the first path is a first distance from the hole where Cx stress will be present if the material has undergone Cx;
- a second transducer pair mounted in or on the acoustic block, operable to transmit and receive ultrasonic waves into the structure in a pitch-catch configuration along a second path parallel to the tangent of the hole;
- wherein the second path is a second distance from the hole where Cx stress will be not be present if the material has undergone Cx;
- wherein the first transducer pair and the second transducer pair are arranged such that their incident angle into the structure provides longitudinal critically refracted waves (LCR) within the structure when placed on a surface of the structure and activated with ultrasonic waves; and
- further comprising an alignment pin mounted in the acoustic block for placement into the hole.

* * * * *